United States Patent
Park et al.

(10) Patent No.: US 7,221,423 B2
(45) Date of Patent: May 22, 2007

(54) THIN FILM PANEL HAVING PARTICULAR PIXEL ELECTRODES OVERLAPPING PARTICULAR DATA LINE PORTIONS

(75) Inventors: Myung-Jae Park, Suwon-si (KR); Young-Joon Rhee, Seoul (KR); Hyeong-Jun Park, Seoul (KR); Hyang-Shik Kong, Suwon-si (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 358 days.

(21) Appl. No.: 10/991,610

(22) Filed: Nov. 17, 2004

(65) Prior Publication Data

US 2005/0134779 A1 Jun. 23, 2005

(30) Foreign Application Priority Data

Nov. 18, 2003 (KR) ............... 10-2003-0081536

(51) Int. Cl.
*G02F 1/1343* (2006.01)
(52) U.S. Cl. .................. 349/139; 349/38; 349/146
(58) Field of Classification Search ............. 349/139, 349/38, 146
See application file for complete search history.

(56) References Cited

U.S. PATENT DOCUMENTS

| | | | | |
|---|---|---|---|---|
| 6,172,728 B1 * | 1/2001 | Hiraishi | ...................... | 349/139 |
| 6,936,845 B2 * | 8/2005 | Kim et al. | ................... | 257/59 |
| 7,046,323 B2 * | 5/2006 | Kim et al. | ................. | 349/129 |
| 7,113,242 B2 * | 9/2006 | Kim et al. | ................. | 349/139 |
| 7,139,043 B2 * | 11/2006 | Kwon et al. | .................. | 349/39 |
| 2002/0039164 A1 * | 4/2002 | Song | .......................... | 349/141 |
| 2004/0189916 A1 * | 9/2004 | Song | .......................... | 349/139 |
| 2006/0279682 A1 * | 12/2006 | Kim et al. | ................. | 349/139 |

* cited by examiner

*Primary Examiner*—Mike Qi
(74) *Attorney, Agent, or Firm*—MacPherson Kwok Chen & Heid LLP

(57) ABSTRACT

A thin film panel is provided, which includes: a substrate; a first signal line formed on the substrate; a second signal line that intersects the first signal line and includes first and second portions being substantially rectilinear and disposed on different straight lines and a connection connected to the first and the second portions; and first and second pixel electrodes disposed adjacent to the second signal line and overlapping the first and the second portions of the second signal line, respectively.

20 Claims, 9 Drawing Sheets

THIN FILM PANEL HAVING PARTICULAR PIXEL ELECTRODES OVERLAPPING PARTICULAR DATA LINE PORTIONS

BACKGROUND OF THE INVENTION (a) Field of the Invention

The present invention relates to a thin film panel, and in particular, to a thin film transistor array panel for a display device.

(b) Description of the Related Art

A display device such as a liquid crystal display (LCD) and an organic light emitting display (OLED) includes a plurality of pixels arranged in a matrix, and each pixel includes a pixel electrode for displaying images. The pixel electrodes are driven by signals from signal lines including gate lines and data lines that intersect each other to define pixel areas and are connected to the pixel electrodes through switching elements such as thin film transistors (TFTs). The switching elements controls data signals from the data lines in response to scanning signals from the gate lines.

The LCD includes a TFT array panel including the signal lines, the pixel electrodes, and the TFTs and a common electrode panel including a common electrode facing the pixel electrodes and a black matrix having openings facing the pixel areas.

When an active area on a backplane for LCDs is too large to use an exposure mask, the entire exposure is accomplished by repeating a divisional exposure called step-and-repeat process. One divisional exposure unit or area is called a shot. Since transition, rotation, distortion, and etc. are generated during light exposure, the shots are not aligned accurately. Accordingly, parasitic capacitances generated between signal lines and pixel electrodes differ depending on the shots, and this causes the luminance difference between the shots, which is recognized at the pixels located at a boundary between the shots. Therefore, the stitch defect is generated on the screen of the LCD due to luminance discontinuity between the shots.

SUMMARY OF THE INVENTION

A motivation of the present invention is to solve the problems of the conventional art.

A thin film panel is provided, which includes: a substrate; a first signal line formed on the substrate; a second signal line that intersects the first signal line and includes first and second portions being substantially rectilinear and disposed on different straight lines and a connection connected to the first and the second portions; and first and second pixel electrodes disposed adjacent to the second signal line and overlapping the first and the second portions of the second signal line, respectively.

Preferably, the first and the second portions of the second signal line fully overlap the first and the second pixel electrodes, respectively.

Each of the first and the second pixel electrodes may have a cutout.

The thin film panel may further include a fourth signal line separated from the first and the second signal lines and overlapping the first and the second pixel electrodes with interposing an insulator to form a storage capacitor.

The thin film panel may further include: a first insulator disposed on the first signal line; and a second insulator disposed between the second line and the first and the second pixel electrodes.

The thin film panel may further include: a gate electrode disposed on the substrate and connected to the first signal line; a semiconductor layer disposed on the first insulating layer; a source electrode disposed at least on the semiconductor layer and connected to the second signal line; and a drain electrode that is disposed at least on the semiconductor layer, separated from the source electrode, and connected to one of the first and the second pixel electrodes.

The semiconductor layer may include a portion disposed under the second signal line.

The portion of the semiconductor layer disposed under the second signal line may have substantially the same planar shape as the second signal line.

A thin film panel is provided, which includes: a substrate; a first signal line formed on the substrate; second and third signal lines intersecting the first signal line, each of the second and the third signal lines including first and second portions being substantially rectilinear and disposed on different straight lines and a connection connected to the first and the second portions; and a pixel electrode disposed between the second signal line and the third signal line and overlapping the first portions of the second signal line and the second portions of the third signal line.

The pixel electrode may fully cover the first portions of the second signal line and the second portions of the third signal line.

The pixel electrode may have a cutout.

The thin film panel may further include a fourth signal line separated from the first and the second signal lines and overlapping the first and the second pixel electrodes with interposing an insulator to form a storage capacitor.

The thin film panel may further include a thin film transistor connected to the pixel electrode and one of the second and the third signal lines.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
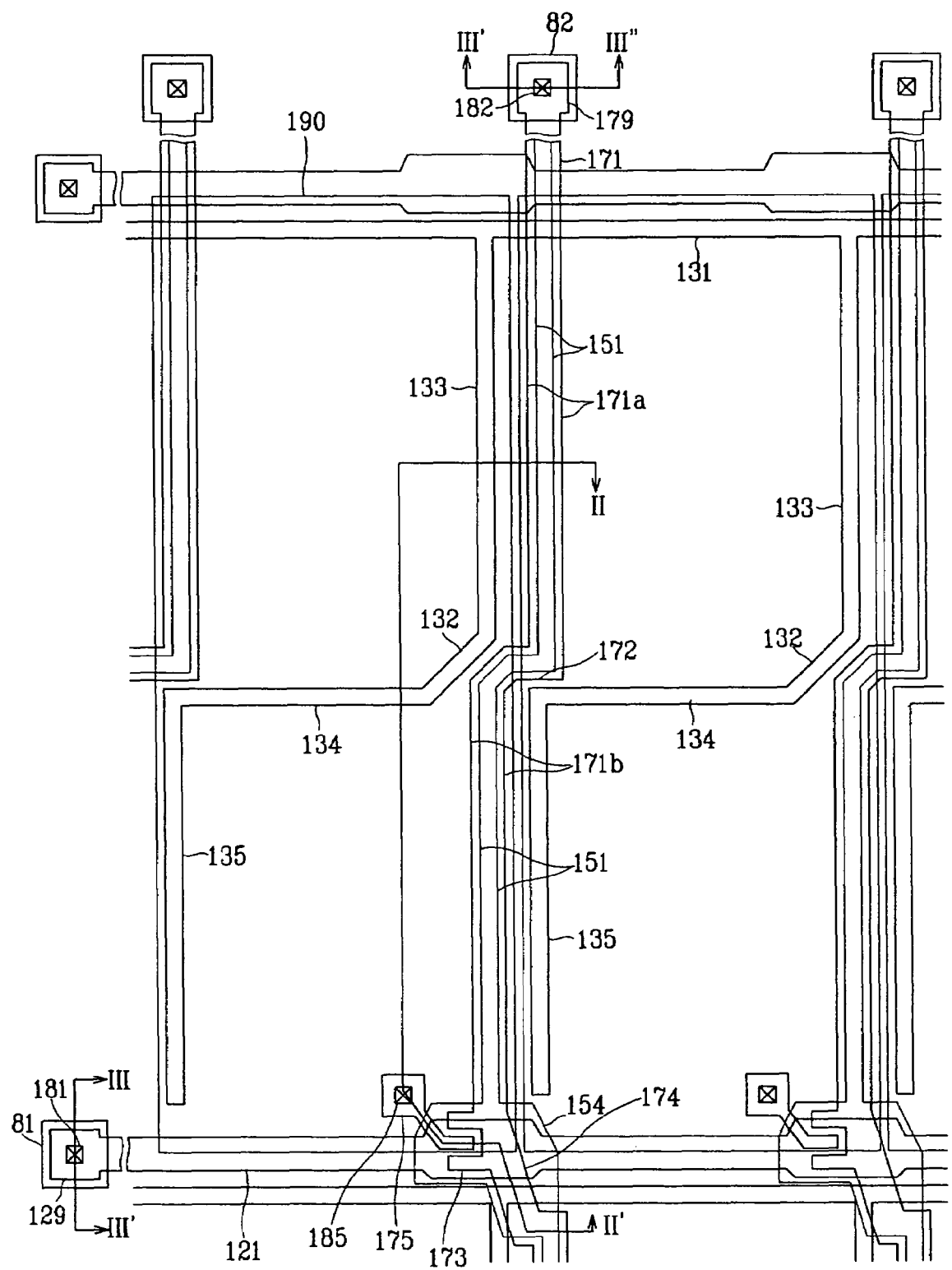
FIG. 1 is an exemplary layout view of a TFT array panel according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, TFT array panels and manufacturing methods thereof according to embodiments of the present invention will be described with reference to the accompanying drawings.

A TFT array panel for an LCD will be described in detail with reference to FIGS. 1–3.

Figure 2:
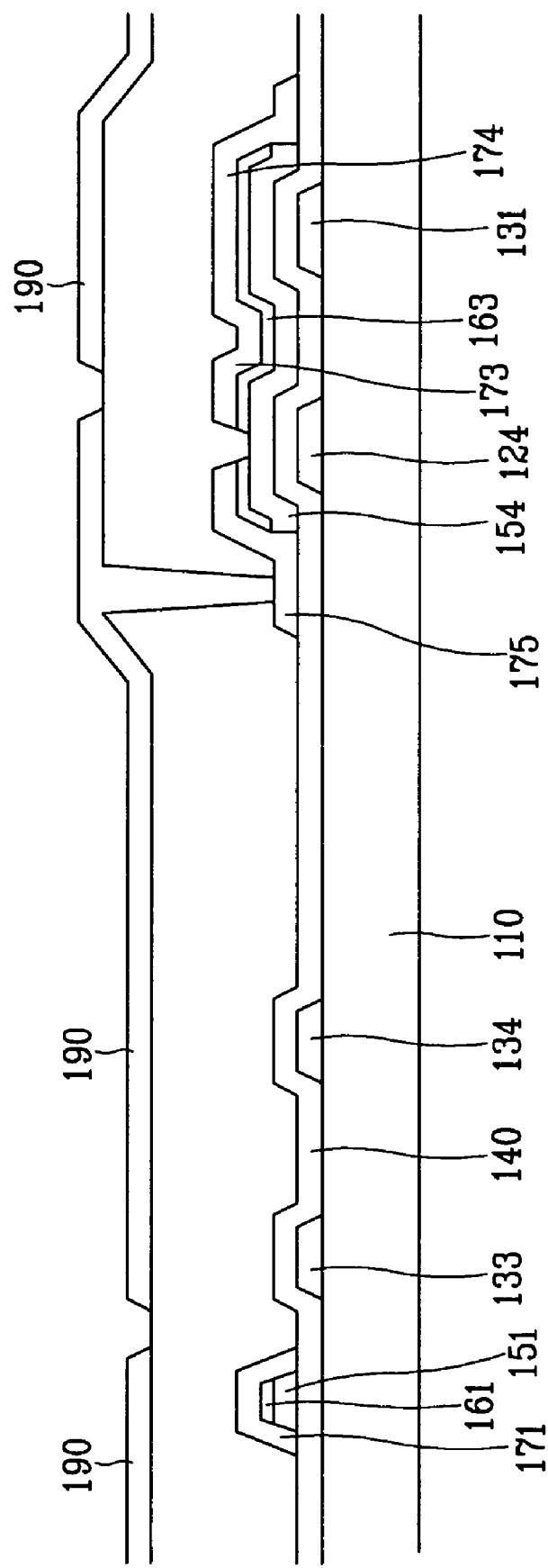
FIG. 2 is a sectional view of the TFT array panel shown in FIG. 1 taken along the line II–II'.
Figure 3:
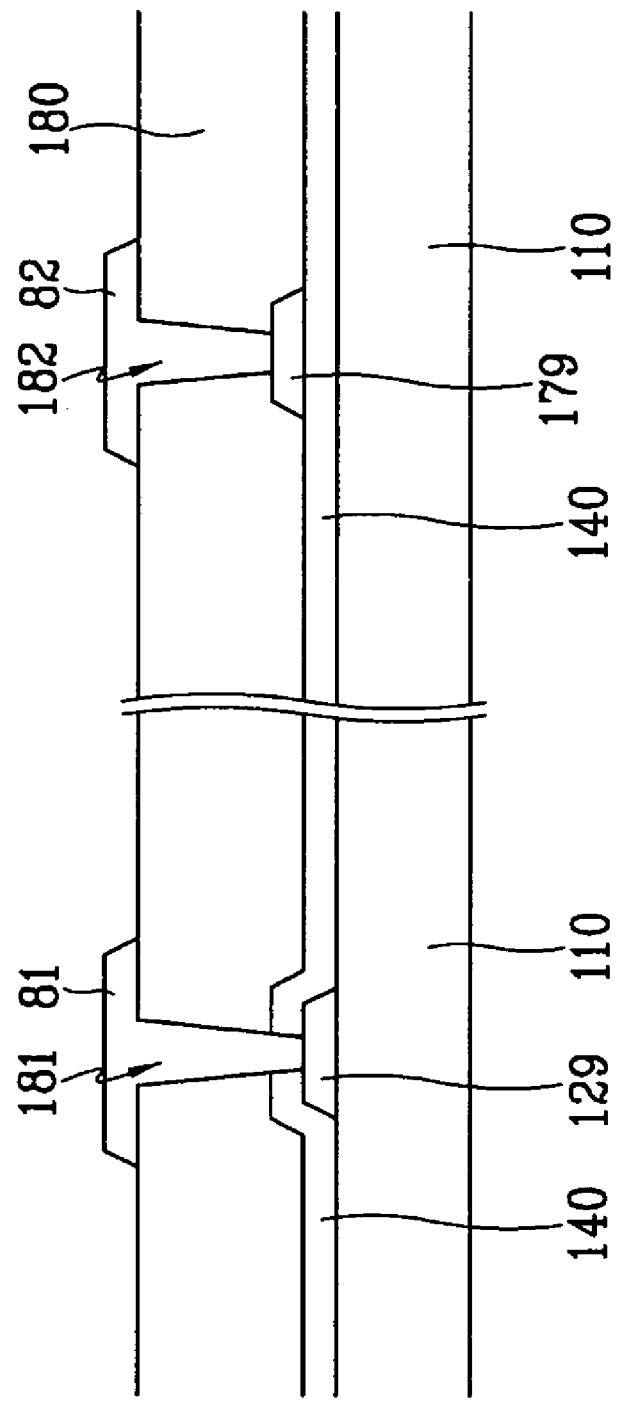
FIG. 3 is a sectional view of the TFT array panel shown in FIG. 1 taken along the lines III–III' and III'–III"

FIG. 1 is an exemplary layout view of a TFT array panel according to an embodiment of the present invention, FIG. 2 is a sectional view of the TFT array panel shown in FIG. 1 taken along the line II–II', and FIG. 3 is a sectional view of the TFT array panel shown in FIG. 1 taken along the lines III–III' and III–III".

A plurality of gate lines 121 and a plurality of storage electrode lines 131, which are separated from each other, are formed on an insulating substrate 110.

Each gate line 121 for transmitting gate signals extends substantially in a transverse direction and a plurality of portions of each gate line 121 projecting upward and downward form a plurality of gate electrodes 124. Each gate line 121 includes an expanded end portion 129 having a large area for contact with another layer or an external device.

Each storage electrode line 131 is disposed between two adjacent gate lines 121. Each storage electrode line 131 includes a stem extending substantially in the transverse direction and adjacent to an upper gate line 121 and a plurality of branches extending from the stem. Each branch extends downward from the stem (that is referred to as an upper longitudinal portion 133), obliquely turns left and runs shortly (that is referred to as an oblique portion 132), turns left again to run left (that is referred to as a transverse portion 134), and turns downward near an oblique portion 132 of an adjacent branch and runs downward (that is referred to as a lower longitudinal portion 135). The storage electrode lines 131 are supplied with a predetermined voltage such as a common voltage, which is applied to a common electrode (not shown) on a common electrode panel (not shown) of the LCD.

The gate lines 121 and the storage electrode lines 131 are preferably made of Al containing metal such as Al and Al alloy, Ag containing metal such as Ag and Ag alloy, Cu containing metal such as Cu and Cu alloy, Cr, Mo, Mo alloy, Ta, or Ti. However, they may have a multi-layered structure including two films having different physical characteristics. One of the two films is preferably made of low resistivity metal including Al containing metal for reducing signal delay or voltage drop in the gate lines 121 and the storage electrode lines 131. The other film is preferably made of material such as Cr, Mo and Mo alloy, Ta or Ti, which has good physical, chemical, and electrical contact characteristics with other materials such as indium tin oxide (ITO) or indium zinc oxide (IZO). Good examples of the combination of the two films are a lower Cr film and an upper Al—Nd alloy film and a lower Al film and an upper Mo film. The gate lines 121 and the storage electrode lines 131 may have a triple-layered structure including a lower Mo film, an intermediate Al film, and an upper Mo film.

In addition, the lateral sides of the gate lines 121 and the storage electrode lines 131 are inclined relative to a surface of the substrate 110, and the inclination angle thereof ranges about 30–80 degrees.

A gate insulating layer 140 preferably made of silicon nitride (SiNx) or silicon oxide is formed on the gate lines 121 and the storage electrode lines 131.

A plurality of semiconductor stripes 151 preferably made of hydrogenated amorphous silicon (abbreviated to "a-Si") are formed on the gate insulating layer 140. The semiconductor stripes 151 are disposed adjacent to the longitudinal portions 133 and 135 of the storage electrode lines 131 and extend substantially in the longitudinal direction and. In detail, each semiconductor stripe 151 runs downward and shortly changes its course toward left near the oblique portions 132 of the storage electrode lines 131. However, the semiconductor stripe 151 immediately runs in the longitudinal direction again. In addition, each semiconductor stripe 151 expands its width on the gate electrodes 124 to form a plurality of projections 154, and obliquely turns right to extend downward again.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate 110, and the inclination angles thereof are preferably in a range between about 30–80 degrees.

A plurality of data lines 171 and a plurality of drain electrodes 175 are formed on the ohmic contacts 161 and 165 and the gate insulating layer 140.

The data lines 171 for transmitting data voltages extend substantially in the longitudinal direction along the semiconductor stripes 151 and intersect the gate lines 121. In detail, each data line 171 runs downward and shortly changes its course toward left near the oblique portions 132 of the storage electrode lines 131 to form a plurality of curved portions 172. However, the data line 171 immediately runs in the longitudinal direction again. In addition, each data line 171 branches out to form a plurality of source electrodes 173 near the gate electrodes 124, and it obliquely turns right (174) to extend downward again. Accordingly, each data line 171 includes a plurality of a pair of upper and lower longitudinal portions 171a and 171b connected by the curved portions 172 and disposed on two parallel straight lines. In addition, each data line 171 includes an expansion 179 having a larger area for contact with another layer or an external device.

Each drain electrode 175 includes an end portion having a large area for contact with another layer and another end portion disposed on a gate electrode 124 and partially enclosed by a source electrode 173. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Cr, Mo, Mo alloy, Ta and Ti. They may also include a lower film (not shown) preferably made of Mo, Mo alloy or Cr and an upper film (not shown) located thereon and preferably made of Al containing metal. Alternatively, the data lines 171, etc., include triple layers interposing a middle layer of Al or Al alloy.

Like the gate lines 121, the data lines 171 and the drain electrodes 175 have tapered lateral sides relative to the surface of the substrate 110, and the inclination angles thereof range about 30–80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and exposed portions of the semiconductor stripes 151, which are not covered with the data lines 171 and the drain electrodes 175. The passivation layer 180 is preferably made of inorganic material such as silicon nitride and silicon oxide. However, the passivation layer 180 may be made of photosensitive organic material having a good flatness characteristic, and low dielectric insulating material such as a-Si:C:O and a-Si:O:F formed by plasma enhanced chemical vapor deposition (PECVD). The passivation layer 180 may have a double-layered structure including a lower inorganic film and an upper organic film.

The passivation layer 180 has a plurality of contact holes 182 and 185 exposing the end portions 179 of the data lines 171 and the drain electrodes 175, respectively. In addition, the passivation layer 180 and the gate insulating layer 140 have a plurality of contact holes 181 exposing the end portions 129 of the gate lines 121. It is preferable that the contact holes 181, 182 and 185 do not expose Al containing metal, and if they expose Al containing metal, the exposed Al containing metal is preferably removed by blanket etch. The contact holes 181, 182 and 185 may expose edges of the end portions 129 and 179 and the drain electrodes 175.

A plurality of pixel electrodes 190 and a plurality of contact assistants 81, 82, which are preferably made of ITO or IZO, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode, which determine the orientations of liquid crystal molecules in a liquid crystal layer (not shown) disposed therebetween.

A pixel electrode 190 and a common electrode form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131.

Each pixel electrode 190 is disposed between adjacent two of the data lines 171 and between adjacent two of the gate lines 121. Furthermore, each data line 190 overlaps both of two adjacent data lines 171. In detail, the pixel electrode 190 overlaps an upper longitudinal portion 171a of a left data line 171 and a lower longitudinal portion 171b of a right data line 171. It is preferable that the upper and the lower portions 171a and 171b of the data lines 171 are completely covered with the pixel electrodes 190.

This configuration keeps the parasitic capacitances between the pixel electrodes 190 and the data lines 171 constant under a divisional exposure for forming thin films on the TFT array panel. That is, the overlapping area between a pixel electrode 190 and two data lines 171 adjacent thereto is kept substantially constant although the pixel electrode 190 is aligned to be closer to the left data line 171 or the right data line 171. Accordingly, the parasitic capacitances between the pixel electrodes 190 and the data lines 171 in different exposure areas, where the positions of the pixel electrodes 190 relative to the data lines 171 may be different, are substantially equal to each other.

The contact assistants 81/82 are connected to the exposed expansions 129/179 of the gate lines 129/the data lines 171 through the contact holes 181/182. The contact assistants 81 and 82 protect the exposed portions 129 and 179 and complement the adhesion between the exposed portions 129 and 179 and external devices.

The pixel electrodes 190 may be made of transparent conductive polymer. For a reflective LCD, the pixel electrodes 190 are made of opaque reflective metal. In these cases, the contact assistants 82 may be made of material such as ITO or IZO different from the pixel electrodes 190.

The TFT array panel may also include a gate driving circuit for generating gate signals to be applied to the gate lines 121 and the contact assistants 81 may be used for connecting the gate driving circuit.

A TFT array panel for an LCD according to another embodiment of the present invention will be described in detail with reference to FIGS. 4 and 5.

Figure 4:
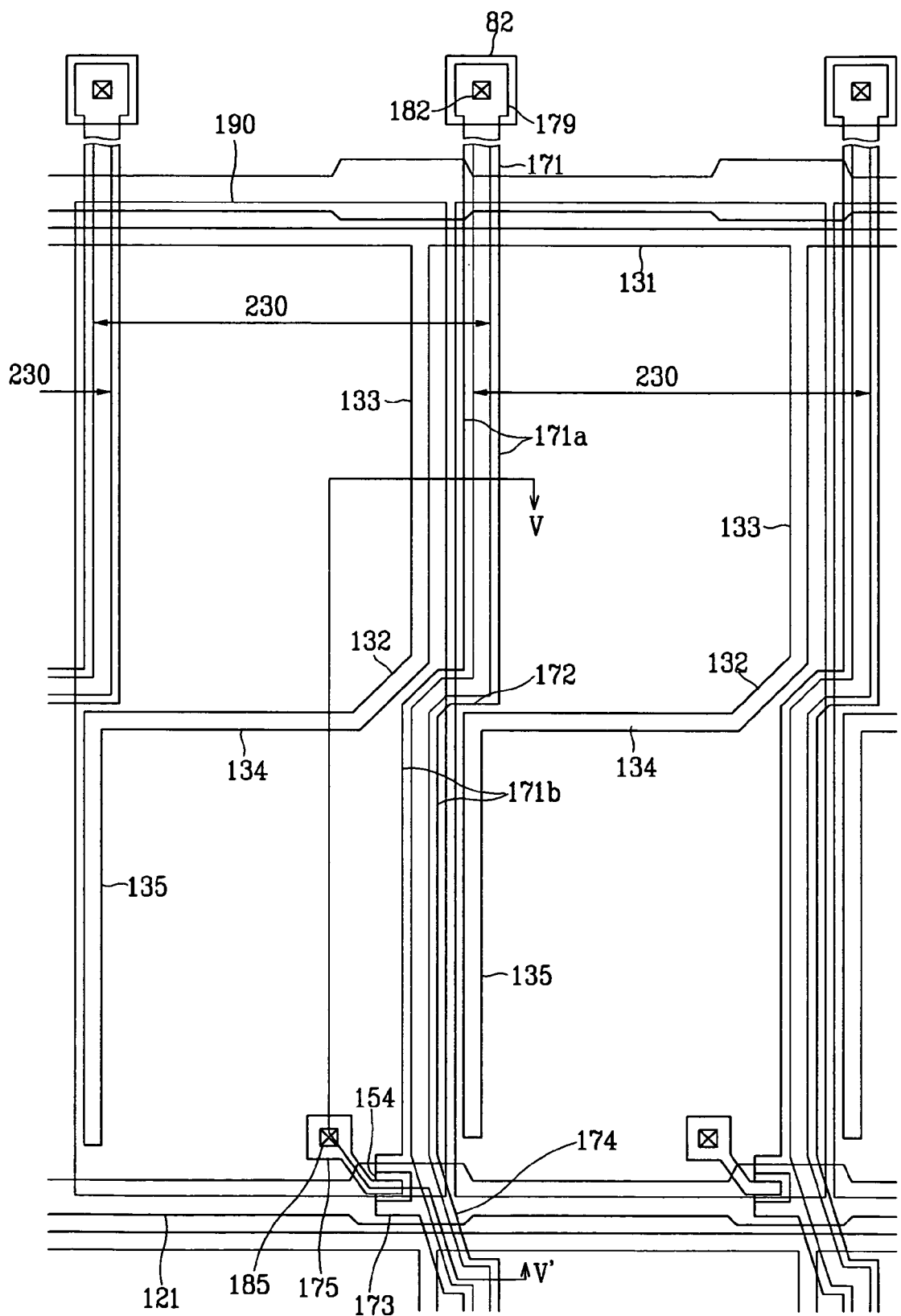
FIG. 4 is a layout view of a TFT array panel for an LCD according to another embodiment of the present invention.
Figure 5:
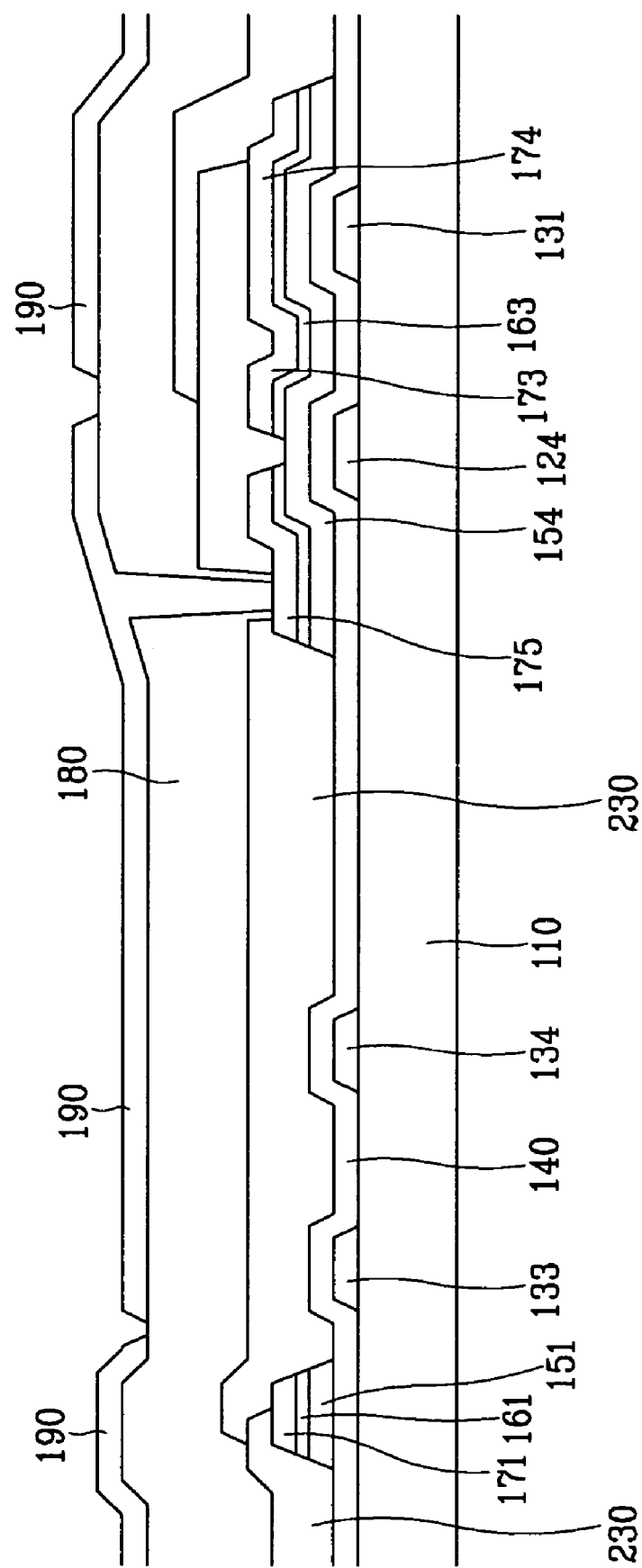
FIG. 5 is a sectional view of the TFT array panel shown in FIG. 4 taken along the line V–V'.

FIG. 4 is a layout view of a TFT array panel for an LCD according to another embodiment of the present invention, and FIG. 5 is a sectional view of the TFT array panel shown in FIG. 4 taken along the line V–V'.

Referring to FIGS. 4 and 5, a layered structure of the TFT array panel according to this embodiment is almost the same as those shown in FIGS. 1–3.

That is, a plurality of gate lines 121 including a plurality of gate electrodes 124 and a plurality of storage electrode lines 131 including branches 132–135 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including pairs of upper and lower longitudinal portions 171a and 171b, curved portions 172, and source electrodes 173 and a plurality of drain electrodes 175 are formed on the ohmic contacts 161 and 165, and a passivation layer 180 are formed thereon. A plurality of contact holes 182 and 185 are provided at the passivation layer 180, and a plurality of pixel electrodes 190 and a plurality of contact assistants 82 are formed on the passivation layer 180.

Different from the TFT array panel shown in FIGS. 1–3, the TFT array panel provides a plurality of color filter stripes 230 under the passivation layer 180. Each of the color filter stripes 230 may represent one of three primary colors such as red, green, and blue and the three colors are preferably arranged in turn in a transverse direction. Each color filter stripe 230 is disposed substantially between adjacent two of the data lines 171 and extends in a longitudinal direction such that edges of the color filter stripe 230 extend along the data lines 171 to be curved. The color filter stripes 230 may be divided into a plurality of color filters disposed in respective areas defined by the gate lines 121 and the data lines 171. The color filter stripes 230 are not disposed on a peripheral area which is provided with the expansions 179 of the data lines 171. Adjacent two of the color filter stripes 230 overlap each other to block the light leakage between the pixel electrodes 190, but the edges thereof may exactly match with each other on the data lines 171, or may be spaced apart from each other. The color filter stripes 230 have a plurality of openings exposing the contact holes 185 and the contact holes 185 are preferably smaller than the openings as shown in FIG. 5.

In addition, the semiconductor stripes 151 of the TFT array panel according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Furthermore, there is no expanded end portion of the gate lines 121, and no contact hole and no contact assistant on the gate lines 121.

Many of the above-described features of the TFT array panel for an LCD shown in FIGS. 1–3 may be appropriate to the TFT array panel shown in FIGS. 4 and 5.

A TFT array panel for an LCD according to another embodiment of the present invention will be described in detail with reference to FIGS. 6–9.

Figure 6:
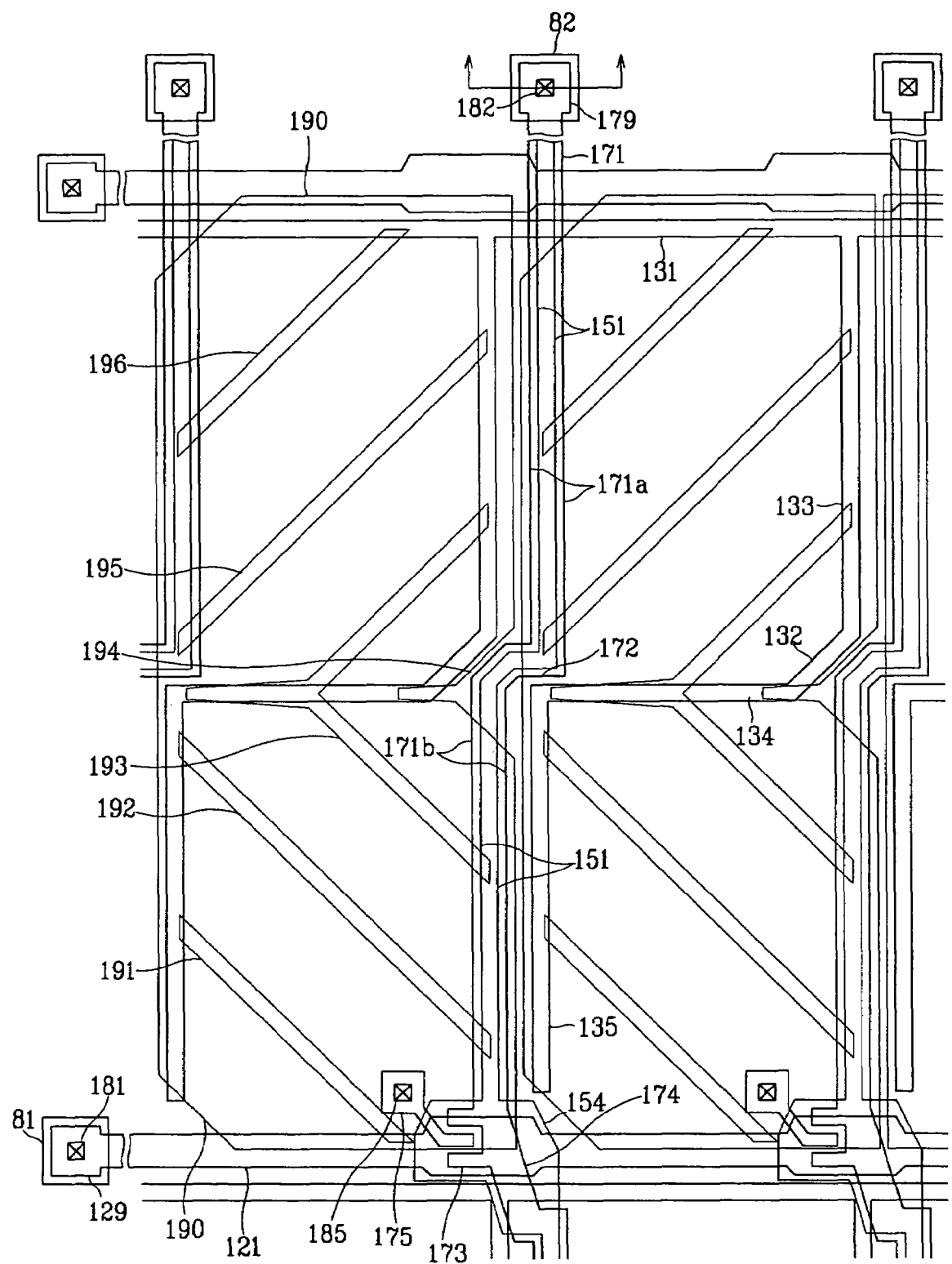
FIG. 6 is a layout view of a TFT array panel of an LCD according to another embodiment of the present invention.
Figure 7:
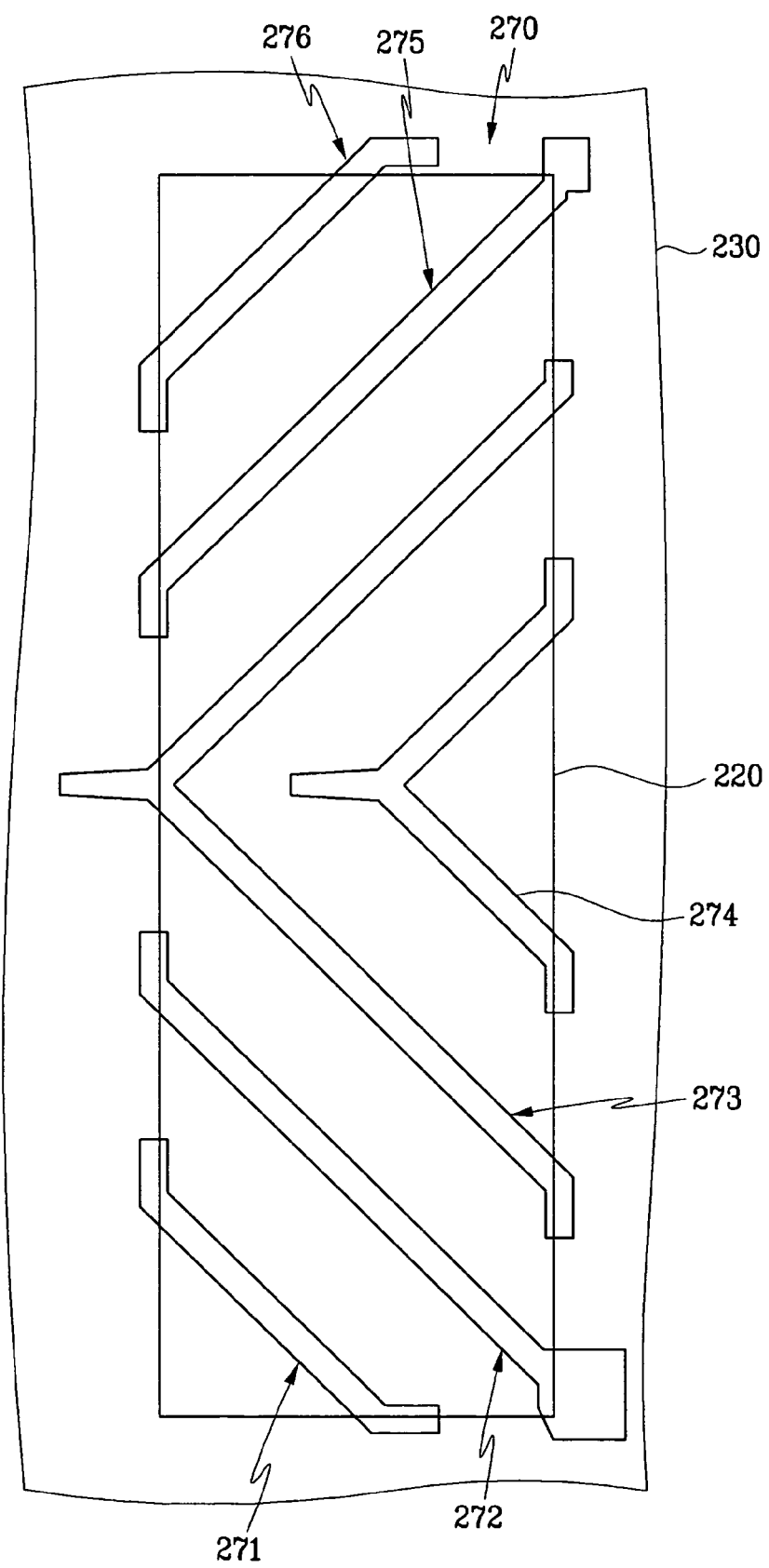
FIG. 7 is a layout view of a common electrode panel of an LCD according to an embodiment of the present invention.
Figure 8:
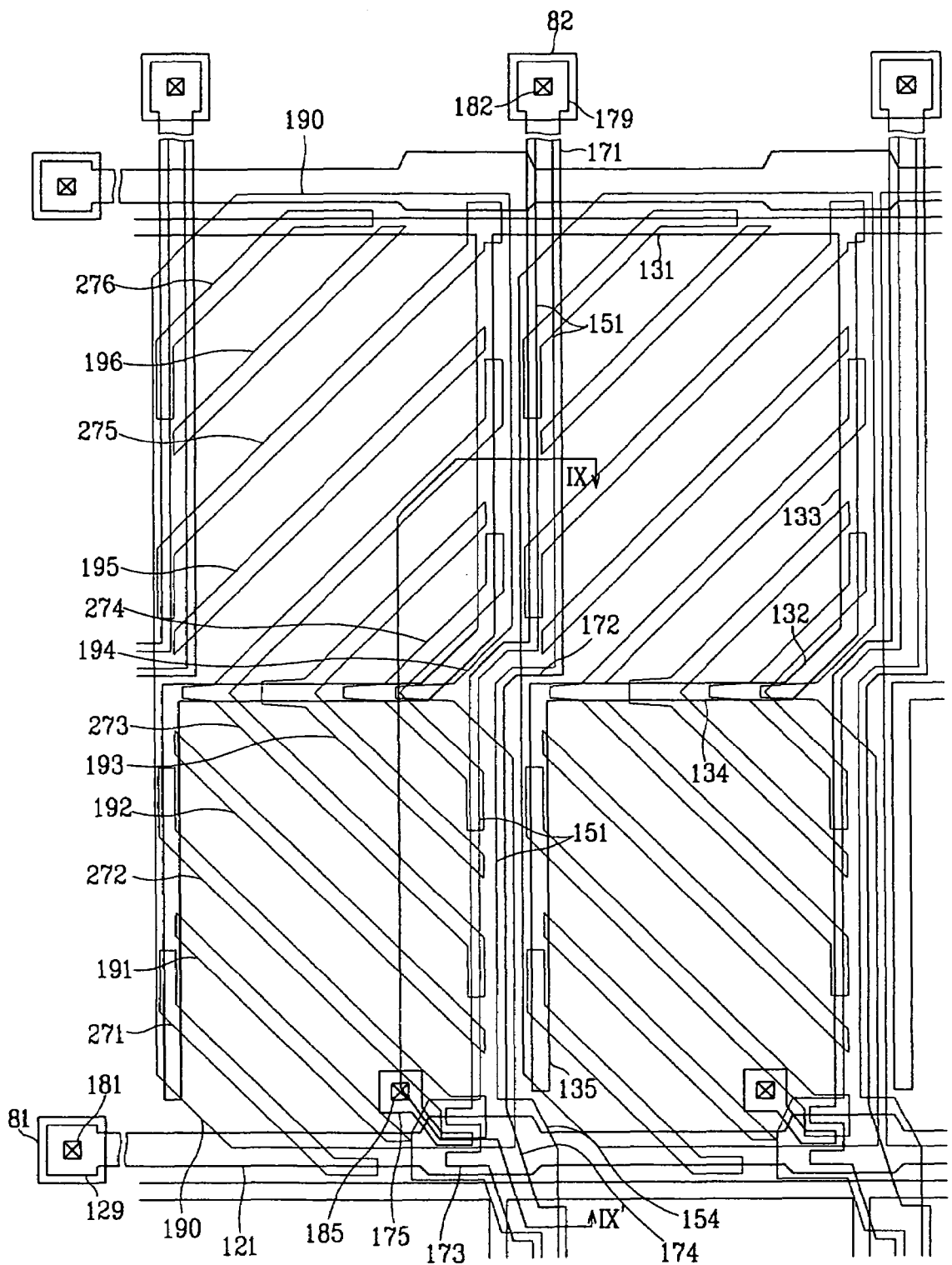
FIG. 8 is a layout view of an LCD including the TFT array panel shown in FIG. 1 and the common electrode panel shown in FIG. 2.
Figure 9:
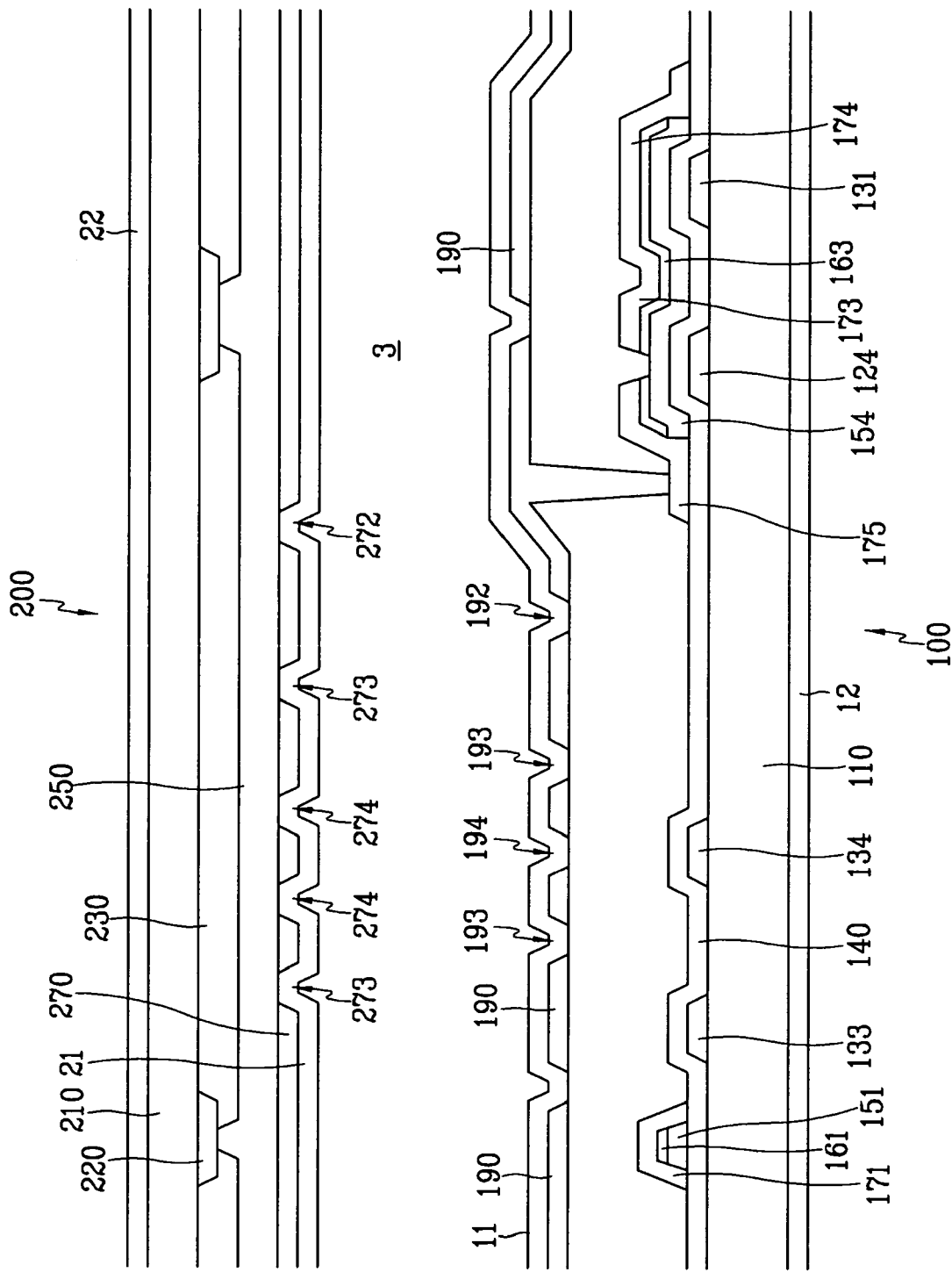
FIG. 9 is a sectional view of the LCD shown in FIG. 8 taken along the line IX–IX'.

FIG. 6 is a layout view of a TFT array panel of an LCD according to another embodiment of the present invention, FIG. 7 is a layout view of a common electrode panel of an LCD according to an embodiment of the present invention, FIG. 8 is a layout view of an LCD including the TFT array panel shown in FIG. 1 and the common electrode panel shown in FIG. 2, and FIG. 9 is a sectional view of the LCD shown in FIG. 8 taken along the line IX–IX'.

An LCD according to this embodiment includes a TFT array panel 100, a common electrode panel 200, and a LC layer 3 interposed between the panels 100 and 200.

The TFT array panel 100 is now described in detail with reference FIGS. 6, 8 and 9.

Referring to FIGS. 6, 8 and 9, a layered structure of the TFT array panel 100 according to this embodiment is almost the same as those shown in FIGS. 1–3.

That is, a plurality of gate lines 121 including a plurality of gate electrodes 124 and a plurality of storage electrode lines 131 including branches 132–135 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including pairs of upper and lower longitudinal portions 171a and 171b, curved portions 172, and source electrodes 173 and a plurality of drain electrodes 175 are formed on the ohmic contacts 161 and 165, and a passivation layer 180 are formed thereon. A plurality of contact holes 181, 182 and 185 are provided at the passivation layer 180, and a plurality of pixel electrodes 190 and a plurality of contact assistants 81 and 82 are formed on the passivation layer 180.

Different from the TFT array panel shown in FIGS. 1 and 2, each pixel electrode 190 of the TFT array panel 100 shown in FIGS. 6, 8 and 9 is chamfered at its upper left corner and the chamfered edge of the pixel electrode 190 makes an angle of about 45 degrees with the gate lines 121.

In addition, each pixel electrode 190 has a plurality of lower cutouts 191 and 192, upper cutouts 195 and 196, and center cutouts 193 and 194, which partition the pixel electrode 190 into a plurality of partitions. The lower and the upper cutouts 191, 192, 195 and 196 are disposed at lower and upper halves of the pixel electrode 190, respectively, and the center cutouts 193 and 194 are located between the lower cutouts 191 and 192 and the upper cutouts 195 and 196. The cutouts 191–196 substantially have inversion symmetry with respect to a transverse portion 134 of the storage electrode line 131 that bisects the lower and the upper halves of the pixel electrode 190.

The lower and the upper cutouts 191, 192, 195 and 196 make an angle of about 45 degrees to the gate lines 121, and the upper cutouts 195 and 196, which extend substantially parallel to each other and to the chamfered upper left edge of the pixel electrode 190, extend substantially perpendicular to the lower cutouts 191 and 192, which extend substantially parallel to each other.

The cutouts 191 and 196 extend approximately from a left longitudinal edge of the pixel electrode 190 approximately to transverse edges of the pixel electrode 190. The cutouts 192 and 195 extend approximately from the left edge of the pixel electrode 190 approximately to a right longitudinal edge of the pixel electrode 190.

The center cutout 193 includes a transverse portion extending approximately from the left edge of the pixel electrode 190 along the transverse portion 134 of the storage electrode line 131 and a pair of oblique portions extending from the transverse portion to the right edge of the pixel electrode 190 and extending substantially parallel to the lower cutouts 191 and 192 and the upper cutouts 195 and 196, respectively. The center cutout 194 extends along the transverse center line of the pixel electrode 190 and has an inlet from the right edge of the pixel electrode 190, which has a pair of inclined edges substantially parallel to the lower cutouts 191 and 192 and the upper cutouts 195 and 196, respectively.

Accordingly, the lower half of the pixel electrode 190 is partitioned into four lower partitions by the lower cutouts 191 and 192 and the center cutout 193, and the upper half of the pixel electrode 190 is also partitioned into four upper partitions by the upper cutouts 195 and 196 and the center cutout 193. The number of partitions or the number of the cutouts is varied depending on the design factors such as the size of pixels, the ratio of the transverse edges and the longitudinal edges of the pixel electrodes, the type and characteristics of the liquid crystal layer, and so on.

Moreover, an alignment layer 11 that may be homeotropic is coated on the pixel electrodes 190 and the passivation layer 180.

Many of the above-described features of the TFT array panel for an LCD shown in FIGS. 1–3 may be appropriate to the TFT array panel 100 shown in FIGS. 6, 8 and 9.

The description of the common electrode panel 200 follows with reference to FIGS. 7–9.

A light blocking member 220 called a black matrix for preventing light leakage is formed on an insulating substrate 210 such as transparent glass. The light blocking member 220 includes a plurality of openings that face the pixel electrodes 190 and have substantially the same shape as the pixel electrodes 190. The light blocking member 220 is preferably made of a single Cr layer, double layers of Cr and Cr oxide, or an organic layer containing black die.

A plurality of color filters 230 are formed on the substrate 210 and they are disposed substantially in the areas enclosed by the light blocking member 220. The color filters 230 may extend substantially in the longitudinal direction along the pixel electrodes 190. Each of the color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably made of transparent conductive material such as ITO and IZO is formed on the overcoat 250.

The common electrode 270 has a plurality of sets of cutouts 271–276.

A set of cutouts 271–276 face a pixel electrode 190 and include a plurality of lower and upper cutouts 271 and 272 and 275 and 276 and center cutouts 273 and 274. Each of the cutouts 271–276 is disposed between adjacent cutouts 191–196 of the pixel electrode 190 or between a cutout 196 and a chamfered edge of the pixel electrode 190. In addition, each of the cutouts 271–276 has at least an oblique portion extending parallel to the lower cutouts 191 and 192 or the upper cutouts 195 and 196 of the pixel electrode 190. The cutouts 271–276 substantially have inversion symmetry with respect to a transverse portion 134 of a storage electrode line 131.

Each of the cutouts 271 and 276 has an oblique portion extending approximately from a left edge of the pixel electrode 190 approximately to a lower or upper edge of the pixel electrode 190 and transverse and longitudinal portions extending from respective ends of the oblique portion along edges of the pixel electrode 190, overlapping the edges of the pixel electrode 190, and making obtuse angles with the oblique portion.

Each of the cutouts 272 and 275 has an oblique portion, a longitudinal portion connected to an end of the oblique portion, and an expansion connected to the other end of the oblique portion. The oblique portion extends approximately from the left edge of the pixel electrode 190 approximately to lower right or upper right corner of the pixel electrode 190. The longitudinal portion extends from the end of the oblique portion along the left edge of the pixel electrode 190, overlaps the left edge of the pixel electrode 190, and makes an obtuse angle with the oblique portion. The expansion covers the respective corner of the pixel electrode 190.

The cutout 273 has a pair of oblique portions extending approximately from the center of the left edge of the pixel electrode 190 to the right edge of the pixel electrode 190, a transverse portion extending from a meeting point of the oblique portions to the left, and a pair of longitudinal portions extending from the respective oblique portions along the right edge of the pixel electrode 190, overlapping the right edge of the pixel electrode 190, and making an obtuse angle with the respective oblique portions. The cutout 274 has a transverse portion extending along the transverse center line of the pixel electrode 190, a pair of oblique portions extending from the transverse portion approximately to the right edge of the pixel electrode 190 and making obtuse angles with the transverse portion, and a pair of longitudinal portions extending from the respective oblique portions along the right edge of the pixel electrode 190, overlapping the right edge of the pixel electrode 190, and making an obtuse angle with the respective oblique portions.

The number of the cutouts 271–276 may be varied depending on the design factors, and the light blocking member 220 may also overlap the cutouts 271–276 to block the light leakage through the cutouts 271–276.

In the meantime, the cutouts 271–276 may expose portions of the color filters 230 if there is no overcoat 250, and the exposed portions of the color filters 230 may contaminate the LC layer 3.

An alignment film 21 that may be homeotropic is formed on the common electrode 270.

Crossed polarizers (not shown) may be disposed on outer surfaces of the panels 100 and 200, and at least one retardation film (not shown) for compensating the retardation of the LC layer 3 may be provided between the polarizers and the panels 100 and 200. One of the polarizers may be omitted when the LCD is a reflective LCD.

It is preferable that the LC layer 3 has negative dielectric anisotropy and it is subjected to a vertical alignment that the LC molecules in the LC layer 3 are aligned such that their long axes are substantially vertical to the surfaces of the panels in absence of electric field.

As shown in FIG. 8, a set of the cutouts 191–196 and 271–276 divides a pixel electrode 190 into a plurality of sub-areas and each sub-area has two major edges.

The cutouts 191–196 and 271–276 control the tilt directions of the LC molecules in the LC layer 3. This will be described in detail.

Upon application of the common voltage to the common electrode 270 and a data voltage to the pixel electrodes 190, an electric field substantially perpendicular to the surfaces of the panels 100 and 200 is generated. The LC molecules tend to change their orientations in response to the electric field such that their long axes are perpendicular to the field direction.

The cutouts 191–196 and 271–276 of the electrodes 190 and 270 and the edges of the pixel electrodes 190 distort the electric field to have a horizontal component that is substantially perpendicular to the edges of the cutouts 191–196 and 271–276 and the edges of the pixel electrodes 190. Accordingly, the LC molecules on each sub-area are tilt in a direction by the horizontal component and the azimuthal distribution of the tilt directions are localized to four directions, thereby increasing the viewing angle of the LCD.

At least one of the cutouts 191–196 and 271–276 can be substituted with protrusions or depressions.

The shapes and the arrangements of the cutouts 191–196 and 271–276 may be modified.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film panel comprising:
   a substrate;
   a first signal line formed on the substrate;
   a second signal line that intersects the first signal line and includes first and second portions being substantially rectilinear and disposed on different straight lines and a connection connected to the first and the second portions; and
   first and second pixel electrodes disposed adjacent to the second signal line and overlapping the first and the second portions of the second signal line, respectively.

2. The thin film panel of claim 1, wherein the first and the second portions of the second signal line fully overlap the first and the second pixel electrodes, respectively.

3. The thin film panel of claim 1, wherein each of the first and the second pixel electrodes has a cutout.

4. The thin film panel of claim 1, further comprising a fourth signal line separated from the first and the second signal lines and overlapping the first and the second pixel electrodes with interposing an insulator to form a storage capacitor.

5. The thin film panel of claim 4, wherein the fourth signal line comprises a curved branch overlapping the first pixel electrode.

6. The thin film panel of claim 5, wherein the curved branch of the fourth signal line is curved near the connection of the second signal line.

7. The thin film panel of claim 6, wherein the curved branch of the fourth signal line comprises first and second portions being substantially rectilinear and disposed on different straight lines and a connection connected to the first and the second portions.

8. The thin film panel of claim 7, wherein the first and the second portions of the curved branch of the fourth signal line are disposed near edges of the first pixel electrode and the connection of the curved branch of the fourth signal line substantially passes through the first pixel electrode.

9. The thin film panel of claim 1, further comprising:
a first insulator disposed on the first signal line; and
a second insulator disposed between the second line and the first and the second pixel electrodes.

10. The thin film panel of claim 9, further comprising:
a gate electrode disposed on the substrate and connected to the first signal line;
a semiconductor layer disposed on the first insulating layer;
a source electrode disposed at least on the semiconductor layer and connected to the second signal line; and
a drain electrode that is disposed at least on the semiconductor layer, separated from the source electrode, and connected to one of the first and the second pixel electrodes.

11. The thin film panel of claim 10, wherein the semiconductor layer includes a portion disposed under the second signal line.

12. The thin film panel of claim 11, wherein the portion of the semiconductor layer disposed under the second signal line has substantially the same planar shape as the second signal line.

13. A thin film panel comprising:
a substrate;
a first signal line formed on the substrate;
second and third signal lines intersecting the first signal line, each of the second and the third signal lines including first and second portions being substantially rectilinear and disposed on different straight lines and a connection connected to the first and the second portions; and
a pixel electrode disposed substantially between the second signal line and the third signal line and overlapping the first portion of the second signal line and the second portion of the third signal line.

14. The thin film panel of claim 13, wherein the pixel electrode fully covers the first portion of the second signal line and the second portion of the third signal line.

15. The thin film panel of claim 14, wherein the pixel electrode has a cutout.

16. The thin film panel of claim 13, further comprising a fourth signal line separated from the first to the third signal lines and overlapping the pixel electrode with interposing an insulator to form a storage capacitor.

17. The thin film panel of claim 16, wherein the fourth signal line is curved near the connections of the second and the third signal lines.

18. The thin film panel of claim 17, wherein the fourth signal line comprises first and second portions being substantially rectilinear and disposed on different straight lines and a connection connected to the first and the second portions.

19. The thin film panel of claim 18, wherein the first portion of the fourth signal line is disposed near the first portion of the second signal line and the second portion of the fourth signal line is disposed near the second portion of the third signal line.

20. The thin film panel of claim 13, further comprising a thin film transistor connected to the pixel electrode and one of the second and the third signal lines.

* * * * *